United States Patent [19]

Yamaoka

[11] Patent Number: 4,576,006

[45] Date of Patent: Mar. 18, 1986

[54] GEOTHERMAL HOT WATER TRANSPORTATION AND UTILIZATION SYSTEM

[75] Inventor: Keijiro Yamaoka, Tokyo, Japan

[73] Assignee: Mitsui Engineering & Shipbuilding Co., Ltd., Tokyo, Japan

[21] Appl. No.: 619,223

[22] Filed: Jun. 11, 1984

[51] Int. Cl.$^4$ ............................................. F03G 7/04
[52] U.S. Cl. .................................. 60/641.5; 60/641.2; 60/641.4
[58] Field of Search ................. 60/641.2, 641.4, 641.5; 165/45

[56] References Cited

U.S. PATENT DOCUMENTS

| | | | |
|---|---|---|---|
| 3,751,673 | 8/1973 | Sprankle | 60/641.2 X |
| 3,824,793 | 7/1974 | Matthews | 60/641.4 |
| 4,391,102 | 7/1983 | Studhalter et al. | 60/641.2 X |

FOREIGN PATENT DOCUMENTS

| | | | |
|---|---|---|---|
| 10168 | 1/1983 | Japan | 60/641.5 |
| 311025 | 8/1971 | U.S.S.R. | 60/641.2 |

Primary Examiner—Stephen F. Husar
Attorney, Agent, or Firm—Browdy and Neimark

[57] ABSTRACT

Disclosed is a system for transporting geothermal hot water taken up at an underground bottom portion of a geothermal production well up to the ground surface, efficiently with a loss suppressed to minimum of the energy possessed by the geothermal hot water, which comprises a downhole pump disposed at an underground bottom portion of the geothermal production well for taking up and pressurizing the geothermal hot water and a rotary separation two-phase flow turbine adapted to be driven by the transported geothermal hot water, the downhole pump being adapted to be driven by the rotary separation two-phase flow turbine. Also disclosed is a system for utilization of underground geothermal hot water, which comprises a downhole pump disposed at an underground bottom portion of a geothermal production well and a rotary separation two-phase flow turbine for pressurizing geothermal hot water taken up and supplied thereto by the downhole pump and supplying pressurized geothermal hot water to a direct contact heat exchanger so as to generate power through the medium of a low boiling-temperature medium, while at the same time separating and supplying steam to a steam turbine to generate power, whereby a power generation by a binary cycle is carried out.

5 Claims, 3 Drawing Figures

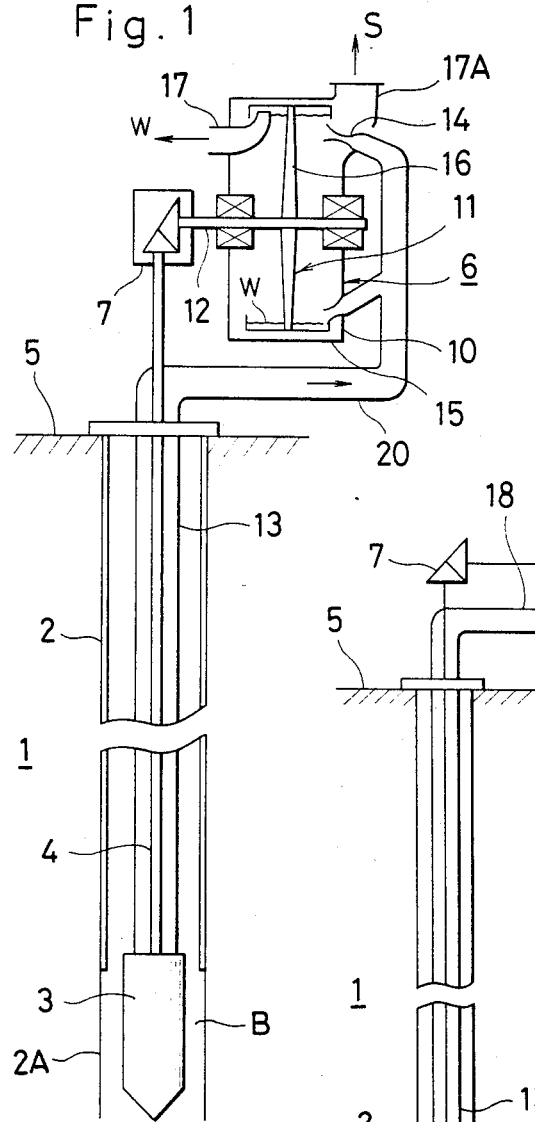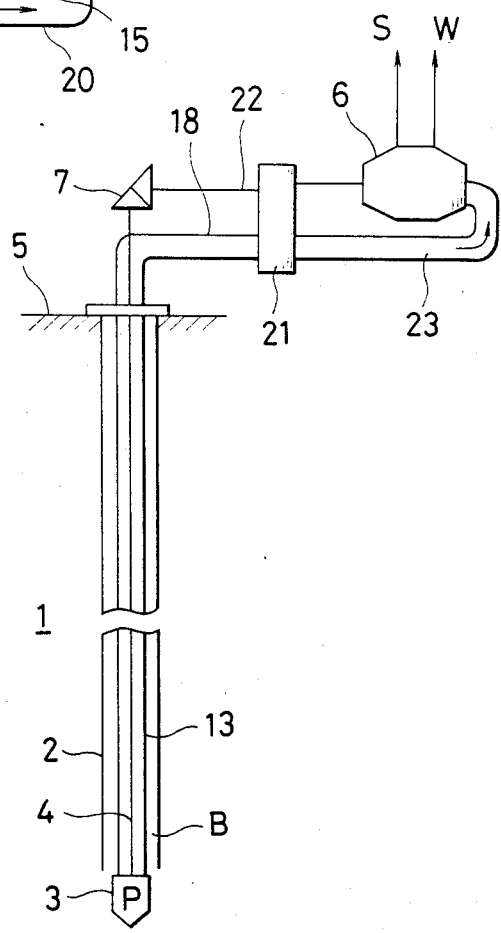

GEOTHERMAL HOT WATER TRANSPORTATION AND UTILIZATION SYSTEM

BACKGROUND

1. Field of the Invention

The present invention relates to a transportation and utilization system which effectively transports geothermal hot water present underground up to the ground surface. More particularly, it is directed to the provision of a transportation and utilization system in which a downhole pump is provided in a production well where the geothermal hot water is present and this downhole pump is driven by a two-phase flow turbine to transport the geothermal hot water up to the ground surface while preventing evaporation thereof.

2. Description of the Prior Art

A wide variety of systems have recently been developed to utilize geothermal hot water for power generation. The geothermal hot water may be saturated under certain pressure. Accordingly, when the pressure is lowered, the geothermal hot water will flash, causing loss of energy contained in the geothermal hot water as much as it evaporates.

For this reason, the important thing to effectively utilize the geothermal hot water is not to lose energy contained therein by preventing its evaporation when being transported.

Underground geothermal hot water undergoes evaporation which turns into steam, which steam spouts out of the ground in the form of mist. When the geothermal hot water is turned into the steam, the temperature is lowered by 15 to 16% since part of energy contained therein may be consumed as mentioned above. Correspondingly, pressure of the geothermal hot water may be lowered and energy is lost as much.

Furthermore, when the geothermal hot water evaporates and is turned into the steam, the volume of the steam becomes considerably larger than that of the geothermal hot water. Therefore, the transportation thereof must deliberately be considered.

For the reasons as mentioned above, high temperature (high pressure) of the geothermal hot water is obtained by preventing evaporation thereof in the ground. Thus, energy contained in the geothermal hot water may be utilized to a full extent.

The geothermal hot water constitutes an integral part of the geothermal-power generation. It is already known that the most effective system to obtain such geothermal hot water is to install a downhole pump in a geothermal production well below the evaporation water level.

However, even if the downhole pump is installed as mentioned above, no power supply system is normally provided where the geothermal hot water is present. In addition, when an internal combustion engine is employed as power source, transportation and maintenance of fuel become a problem.

SUMMARY

It is an object of the present invention to provide a transportation system which transports geothermal hot water up to the ground surface without losing energy thereof and which is readily maintained, and a utilization system which most effectively generates electric power by utilizing the geothermal hot water transported according thereto.

In order to achieve the aforementioned object, the present invention is constructed of: (1) a transportation system which transports geothermal hot water present underground up to the ground surface, characterized in that a downhole pump is installed in a geothermal production well, this downhole pump being driven by a rotary separation two-phase flow turbine and the geothermal hot water transported by this downhole pump is supplied to said turbine so as to drive the same and (2) a geothermal hot water utilization system, characterized in that the geothermal hot water supplied by the downhole pump is pressurized by a rotary separation two-phase flow turbine until necessary pressure is obtained and is supplied to a direct contact heat exchanger so as to perform power generation with medium of a low boiling temperature and steam evaporated in the rotary separation two-phase flow turbine is supplied to a steam turbine for power generation, whereby power is generated by a binary cycle.

THE DRAWINGS

FIG. 1 is a schematic representation of a system for collecting geothermal hot water according to a first embodiment of the present invention;

FIG. 2 is a schematic representation of a system for collecting the geothermal hot water according to a second embodiment of the present invention.

THE PREFERRED EMBODIMENTS

Figure 3:
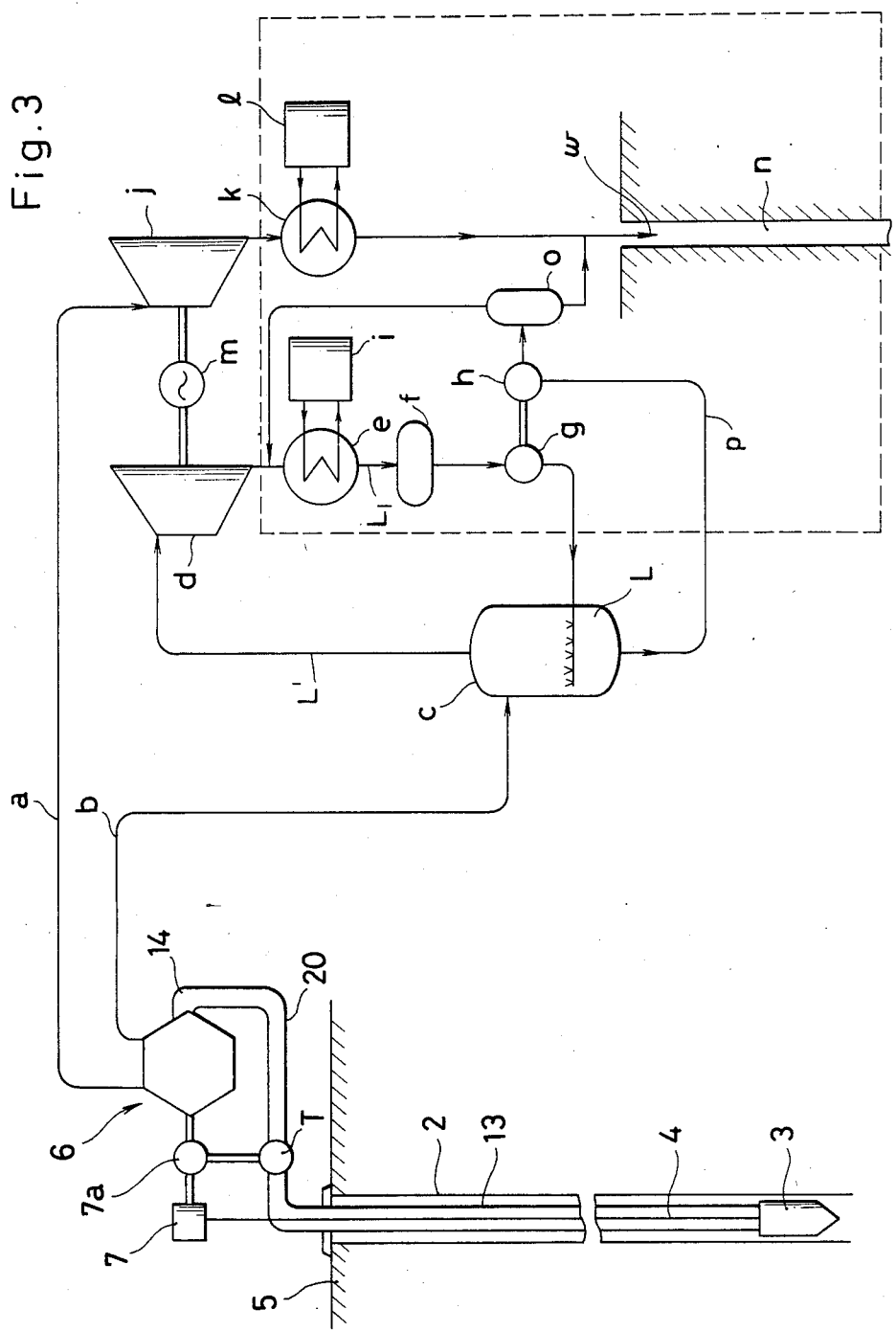
FIG. 3 is a schematic representation of a hybrid geothermal power system according to a third embodiment of the present invention.

Preferred embodiments of the present invention will now be described with reference to the drawings.

As shown in FIG. 1, a geothermal production well 2 is formed (or a geothermal production well casing is installed) in a ground 1, this geothermal production well 2 being provided with a downhole pump 3 below an evaporating water level 2A. A driving shaft 4 of this downhole pump 3 is extended up to a ground surface 5. Provided on the ground surface 5 is a rotary separation two-phase flow turbine 6 which is so constructed as to drive the driving shaft 4 of said downhole pump 3 by means of a power transmission such as a gearbox 7 and the like.

The rotary separation two-phase flow turbine 6 is a turbine whose power source comes from mixed flow of hot water and steam, that is, two-phase geothermal hot water B. A rotary separator (rotary turbine) 11 is rotatably supported by a shaft 12 in a casing 10, serving as power source for said gearbox 7.

In case that the downhole pump 3 is driven by a motor, a generator is driven by the rotary separation two-phase flow turbine 6 and said downhole pump 3 may further be driven by utilizing electric power thus generated. However, this explanation is omitted. Now, actuation of the driving shaft 4 directly by the rotary separation two-phase flow turbine 6 will be described hereinbelow.

In said casing 10, the geothermal hot water B discharged from the downhole pump 3 and transported by a pump casing 13 is sprayed onto said rotary separator 11 so as to drive the same. As shown in FIG. 1, this rotary separator 11 is constructed of a cylindrical body 15, and a plate member 16 and a rotating shaft 12 provided at the central portion of this cylindrical body 15. When this is rotated, hot water W may be attached to the inner surface of said cylindrical body 15 while steam S is separated and the hot water W is collected from a hot water collecting diffuser 17 having an opening in the proximity of the cylindrical body 15.

The driving shaft 4 may be as long as 500 to 600 m, a number of which being interconnected in line with one another and extended along within the pump casing 13 formed in the geothermal production well 2.

When the geothermal two-phase flow discharged from the downhole pump 3 as mentioned above is supplied to the rotary separation two-phase flow turbine 6, the rotary separator 11 is driven and the driving shaft 4 of the downhole pump 3 is driven by part or all of the power generated thereby via the gearbox 7. As a result thereof, the downhole pump 3 provided at the front end of the driving shaft 4 may be driven. This downhole pump 3 directly intakes and pressurizes the geothermal hot water B and thus transports the same up to the ground surface 5 via the pump casing 13 and a transporting pipe 20.

The geothermal two-phase flow in the downhole, that is, the geothermal hot water B is transported under pressure corresponding to its temperature through the pump casing 13 so that evaporation may be prevented. For this reason, it may be transported to a well head at the same temperature as that in the downhole where the downhole pump 3 is installed.

On the other hand, part or all of the geothermal hot water B is supplied to said rotary separation two-phase flow turbine 6 whereby the steam S and the hot water W are separated one another. Further, the steam S is collected from a steam collecting pipe 17A and the hot water W is collected from the hot water collecting diffuser 17, both being transported according to respective usage.

Upon driving this rotary separation two-phase flow turbine 6, part of the energy contained in the geothermal hot water B may be consumed. However, the amount of energy necessary to drive this turbine is as low as 5 to 6%, which is considerably lower than that consumed when the geothermal hot water B flashes and temperature and pressure thereof are lowered, i.e., 10 to 13%. Therefore, the difference between the amount of energy lost when the geothermal hot water B flashes and that consumed when the turbine 6 is driven is around 10%.

Additionally, according to the present invention, the geothermal hot water B may be transported up to the ground surface without flashing since it is being transported under sub-cooled condition. Accordingly, the geothermal hot water B may be collected with the same temperature and pressure as in the downhole, thereby obtaining high temperature geothermal hot water.

FIG. 2 is a schematic representation of a system according to another embodiment of the present invention, which enables more effectively to collect energy contained in the hot water.

Upon transporting the geothermal hot water B present in the downhole pump up to the well head, pressure of the geothermal hot water B is adjusted higher than that required by the hot water to be supplied to the rotary separation two-phase flow turbine 6 so that evaporation of the geothermal hot water B due to friction of the pump casing 13 may be prevented.

Pressure of the hot water to be supplied to the rotary separation two-phase flow turbine 6 should not be higher than saturated. If higher than saturated, energy contained in the geothermal hot water B may not be collected by this rotary separation two-phase flow turbine 6. Accordingly, energy higher than that the saturated geothermal hot water can hold is discarded as waste energy. It is an object of this second embodiment to collect this waste energy.

A power collecting turbine 21 is provided in the transporting pipe 18 which links between the upper end of the pump casing 13 and the rotary separation two-phase flow turbine 6 and an input shaft 22 to the gearbox 7 may be driven by power collected by this power collecting turbine 21.

Pressure more than necessary to retain the saturated geothermal hot water to be supplied to the rotary separation two-phase flow turbine 6 may be collected by said power collecting turbine 21 whereby hot water within a pipe 23 is saturated and is supplied to the rotary separation turbine 6.

FIG. 3 illustrates another embodiment wherein high efficiency steam separation and pumping function of the rotary separation two-phase flow turbine as a driving means for the downhole pump and binary-power generation and steam turbine-power generation by a direct contact heat exchanger are associated together.

After the geothermal hot water is pressurized by the downhole pump 3 and passes through a hydraulic turbine T, it drives a gearbox 7a whereby the saturated hot water to be supplied to the rotary separation two-phase flow turbine 6 may be collected under pressure more than necessary to retain its saturated condition.

High-pressure geothermal hot water b pressurized in the rotary separation two-phase flow turbine 6 is supplied to a direct contact heat exchanger c without passing through a pump. A medium of a low boiling temperature is vaporized by this heat exchanger c and this vaporized medium L' is supplied to a low boiling temperature medium turbine d. This low boiling temperature medium turbine d and a steam turbine j are adapted to drive a generator m jointly.

Furthermore, exhaust gas from said low boiling temperature medium turbine d is condensed by a condensor e having a cooling tower i and condensed water $L_1$ is flashed to the direct contact heat exchanger c via a receiver f and pump g. The pump g is driven by the hydraulic turbine h which is also driven by hot water p flowing out of the direct contact heat exchanger c. Further, the hot water discharged from this hydraulic turbine h is supplied to a flasher o and water w discharged from this flasher o is supplied to a reducing well n.

Steam a purely evaporated by the rotary separation two-phase flow turbine 6 is supplied to the steam turbine j. Exhaust gas from this steam turbine j is condensed through a condensor k connected to a cooling tower l and is returned to the reducing well n.

Such hybrid geothermal power system which associates the turbine d with the steam turbine j driven by the downhole pump 3, rotary separation two-phase flow turbine 6, direct contact heat exchanger c and medium l of a low boiling temperature is most efficient and economical.

As described in detail hereinabove, the construction of the present invention is such that the rotary separation two-phase turbine 6 is driven by the geothermal hot water (two-phase flow) so as to obtain power and the downhole pump 3 is driven by this power so as to collect the geothermal two-phase flow. Hence, the present invention has the following effects:

(1) As the geothermal hot water present underground is transported up to the well head without flashing, loss of energy contained in the geothermal hot water is small in the course of such transportation.

In a conventional system wherein the geothermal hot water is evaporated in the geothermal hot water casing and is in the state of mixed flow of steam and hot water when collected on the ground, energy contained in said mixed flow is generally 10% less than that contained in the geothermal hot water. On the other hand, in the system according to the present invention, energy of the geothermal hot water may be lost only when the rotary separation two-phase flow turbine 6 is driven thereby. However, the loss of energy is only 5 to 6%. This is very small as compared to the case of said mixed flow. Therefore, energy of the geothermal hot water may effectively be collected.

Particularly, in case that temperature of the geothermal hot water is in the vicinity of 150° to 200° C., as the temperature of this geothermal hot water decreases, the utility value of this geothermal hot water may considerably diminish. On the other hand, according to the present invention, the geothermal hot water of two-phase flow may be transported up to the well head without losing the temperature. Hence, the utility value of this geothermal hot water may considerably increase.

(2) Generally, no electric power is supplied where the geothermal hot water is present and also the transportation of materials is difficult. However, the rotary separation two-phase flow turbine 6 may readily be driven by this geothermal hot water and the downhole pump 3 may further be driven by the power obtained in this turbine 6. Consequently, the geothermal hot water may be transported up to the well head almost without loss of its energy and energy contained in the geothermal hot water may effectively be collected.

(3) With the adoption of the hybrid geothermal power generation system comprising the downhole pump 3, rotary separation two-phase flow turbine 6, direct contact heat exchangers e and k, low boiling temperature medium turbine d and steam turbine j wherein the steam separation function of the rotary separation two-phase flow turbine 6 is associated with the steam turbine j and the pumping function thereof is associated with the direct contact heat exchangers for a supply of the hot water, power may be economically generated by medium-low temperature geothermal resource.

What is claimed is:

1. A geothermal hot water transportation system for transporting geothermal hot water from underground to above ground, comprising
    means for pressurizing and pumping hot water from a geothermal production well to a location above ground including a downhole pump for installation in the geothermal production well, and a long downhole pump shaft;
    a pump casing having a below surface end connected to said down hole pump and an above surface end;
    means for separating steam and hot water brought to the surface from the well by said downhole pump through said pump casing, including an above ground rotary separation two-phase flow turbine communicating with said above surface end of said pump casing, said two-phase flow turbine having a power output shaft means for directly powering said downhole pump through said downhole pump shaft.

2. A geothermal hot water transportation system according to claim 1 further comprising a power collecting turbine located between the upper end of said pump casing and said two-phase flow turbine, said power collecting turbine having an output connected to said power output shaft means of said two-phase flow turbine.

3. A geothermal hot water utilization method, comprising the following steps (i) to (v):
    (i) compressing geothermal hot water and supplying the compressed geothermal hot water to a rotary separating two-phase flow turbine by a downhole pump disposed below the evaporation water level in a geothermal hot water well,
    (ii) separating the geothermal hot water into hot water and steam through the rotary separation two-phase flow turbine,
    (iii) compressing the above separated hot water by a diffuser provided in the rotary separating two-phase flow turbine, supplying the compressed hot water (b) to a direct contact heat exchanger and, by letting said compressed hot water directly contact a low boiling-point medium to be jetted into the heat exchanger by the below recited step (v), vaporizing the low boiling-point medium,
    (iv) supplying said separated steam (a) to a steam turbine to drive the turbine, while supplying said vaporized low boiling-point medium from the above step (iii) to a low boiling-point medium turbine, to thereby generate power;
    (v) condensing exhaust gas from the low boiling-point medium turbine by a condenser, while supplying discharged hot water from the direct contact heat exchanger to a hydraulic turbine so as to drive the turbine by the pressure thereof and to raise the pressure of the low boiling-point medium condensed by the condenser by a pump driven by the hydraulic turbine, and jetting the pressure-raised low boiling-point medium into the direct contact heat exchanger in the above step (iii).

4. A geothermal hot water utilization method according to claim 3, wherein power generation is performed by a generator disposed between the low boiling-point medium turbine and the steam turbine.

5. A geothermal hot water utilization method according to claim 3, wherein said rotary separation two-phase flow turbine comprises a cylindrical casing having a horizontally disposed shaft, a cylindrical body supported within said cylindrical casing by said horizontally disposed shaft, and a rotary separator comprising a diametrically extending partition wall, disposed in a central portion of said cylindrical casing.

* * * * *